United States Patent [19]

Sorensen

[11] 4,422,998

[45] Dec. 27, 1983

[54] CONTROLLED EJECTION METHOD FOR INJECTION MOLDING

[76] Inventor: Jens O. Sorensen, P.O. Box 2274, Rancho Santa Fe, Calif. 92067

[21] Appl. No.: 370,937

[22] Filed: Apr. 22, 1982

[51] Int. Cl.$^3$ .............................................. B29C 7/00
[52] U.S. Cl. .................................. 264/335; 425/437; 425/DIG. 102
[58] Field of Search ........................... 264/334, 335; 425/DIG. 102, 437

[56] References Cited

U.S. PATENT DOCUMENTS

| | | | |
|---|---|---|---|
| 3,008,181 | 11/1961 | Fitz | 264/335 X |
| 3,128,499 | 4/1964 | Smolenski | 425/DIG. 102 |
| 3,634,997 | 1/1972 | Tait | 53/127 |
| 3,852,011 | 12/1974 | Maiocco | 425/444 X |
| 3,910,740 | 10/1975 | Rees | 425/437 X |
| 4,118,168 | 10/1978 | Rees | 425/556 |

*Primary Examiner*—Thomas P. Pavelko
*Attorney, Agent, or Firm*—Brown & Martin

[57] ABSTRACT

A method of controlled ejection of a molded product in relation to orientation, speed of ejection and/or sterility is disclosed. The method is not dependent on auxiliary moving parts or vulnerable pins or blades. The molded product is ejected into a substantially enclosed guide conduit where the contours of the conduit substantially are regions of the parting surface and the cavity/ies. The guide conduit may be fairly holeproof, whereby a very fast ejection may be accomplished when the molded product is transported in an air stream in a manner similar to a pneumatic dispatch, not necessarily in a downward direction. The molded product may be kept sterile while it is transported in a stream of sterile air.

6 Claims, 12 Drawing Figures

CONTROLLED EJECTION METHOD FOR INJECTION MOLDING

FIELD OF THE INVENTION

The invention relates to a method of injection molding of plastic and specifically to an improved method of controlled ejection of the injection molded product from the mold.

DISCUSSION OF PRIOR ART

Heretofore controlled ejection of injection molded plastic products have employed complicated mobile guide rails or guide pins, which wear down and reduce production stability. Other methods have employed stationary elements such as pins or blades which may be received in recesses of the confronting mold part in the closure position. But such pins or blades are quite vulnerable, particularly in case a molded product gets caught between the mold parts during the closing action. Also the recesses are quite difficult to clean in case the injected plastic material by accident flashes and finds its way into the recesses.

OBJECTS OF THE INVENTION

Among the objects of the invention are to facilitate controlled ejection of the injection molded product in relation to its orientation, speed of ejection, and/or sterility, basically without the need of auxiliary moving parts or vulnerable elements such as pins or blades. Further objects and advantages of the invention will become apparent from the subsequent descriptions and drawings.

SUMMARY OF THE INVENTION

A method of cyclic injection molding of plastic where the mold comprises two parts which are separated by a parting surface and at least one cavity situated internally to the boundaries of the parting surface, and wherein each production cycle comprises the steps of:

(a) Combining the two mold parts by moving, in a predetermined direction, the mold parts in relation to each other;

(b) Injecting plastic in a fluid state into a cavity situated within the parting surface;

(c) Solidifying the injected plastic in the cavity, thereby creating a molded product;

(d) Separating the two mold parts by moving, in a direction opposite to the predetermined direction, said mold parts in relation to each other to create a substantially enclosed guide conduit having contours defined by the regions of the parting surface and the internally positioned cavity/ies that are exposed subsequent to separation and leading in a direction substantially perpendicular to said predetermined direction.

(e) Ejecting the plastic product into the guide conduit; and (f) Transporting the ejected product through the guide conduit. The ejected product may be transported through the guide conduit at an orientation directed by the contours of the guide conduit.

Since it is possible to make the contours of the guide conduit fairly holeproof, a very fast ejection may be accomplished when a stream of air is passed through the guide conduit, in which case the molded product may be transported in the guide conduit in a manner similar to a pneumatic dispatch, and not necessarily in a downward direction.

When the temperature of the injected plastic is at a sterilizing temperature, the molded product is sterile as ejected into the guide conduit. A stream of air which is sterile may be used, in which case the molded products can be transported in a sterile environment from the cavities to, for instance, a sterile packing facility. In this case it is preferable that the pressure of the sterile air in the guide conduit is at a slightly higher pressure than the pressure outside of the guide conduit, so that the outside air is not drawn into the guide conduit which may not be absolutely holeproof.

DESCRIPTION OF THE PREFERRED EMBODIMENTS

Figure 1:
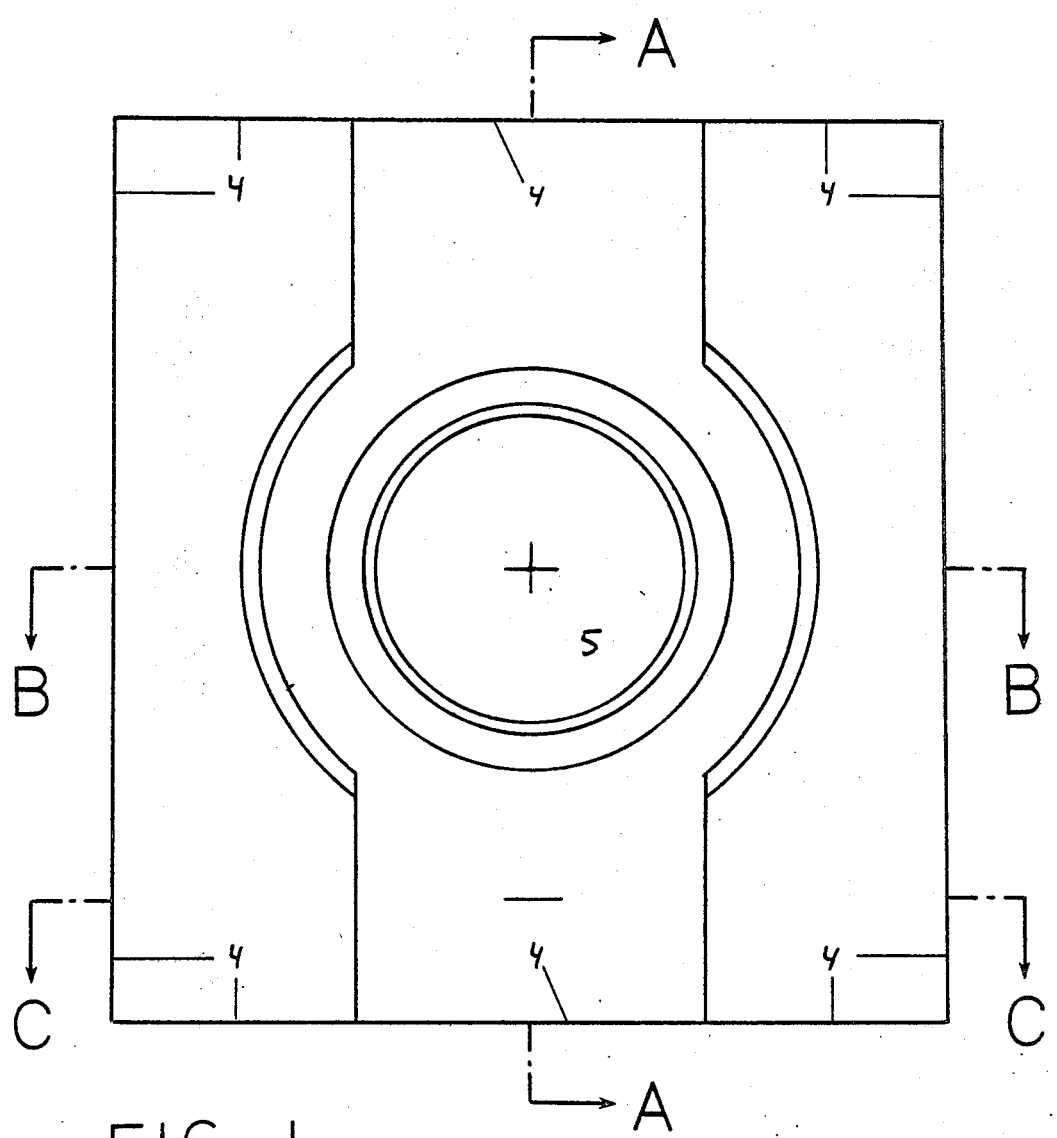
FIG. 1 illustrates elevational transparent end view of an injection mold with one cavity employed in the method of the invention.

FIGS. 1 to 7 illustrate various sectional views of an injection mold used in a first preferred embodiment of the method of the invention. Like reference numbers refer to like components in these figures.

The injection mold comprises a first mold part 1 and a second mold part 2 separated by a parting surface 3a, 3b, 3c, 3d, 3e, 3f, 3g, 3h and a cavity 5 which is situated internally to the boundaries 4a, 4b, 4c, 4d, 4e, 4f of the parting surface. A molded plastic product 6, a petri dish, is shown being ejected by the stripper plate 10 from the cavity 5 into a guide conduit 7. The contours 8a, 8b, 8g, 8k, 8l, 8m of the guide conduit 7 substantially are regions of the parting surface 3a, 3b, 3c, 3d, 3e, 3f, 3g, 3h and the cavity 5. Steering cones 9a, 9b have the shape of conical surfaces and are used to guide the two mold parts accurately together when combined.

Figure 2:
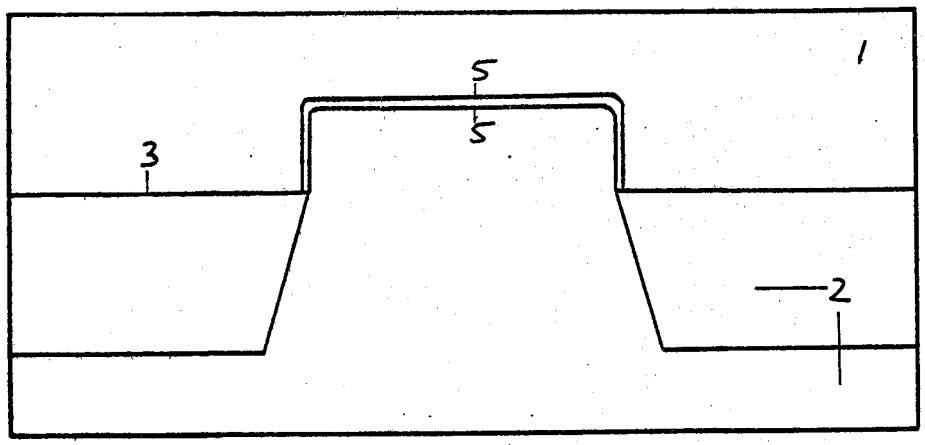
FIG. 2 illustrates a cross sectional view of the mold of FIG. 1 in a combined position as seen through section line A—A.
Figure 4:
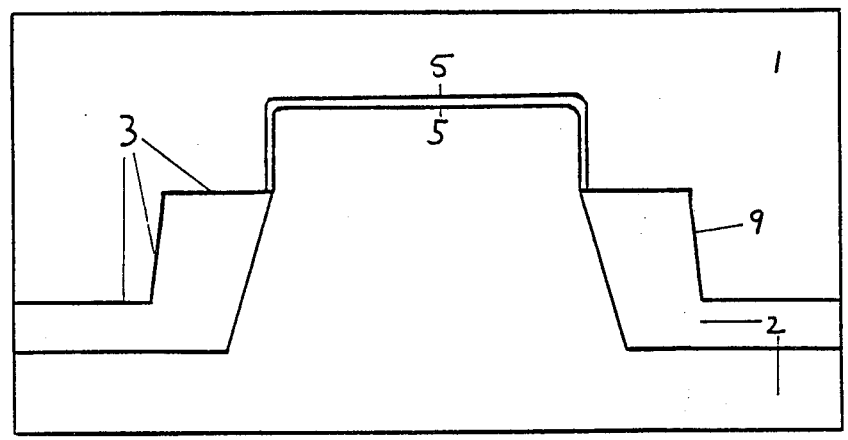
FIG. 4 illustrates a cross sectional view of the mold of FIG. 1 in a combined position as seen through section line B—B.
Figure 6:
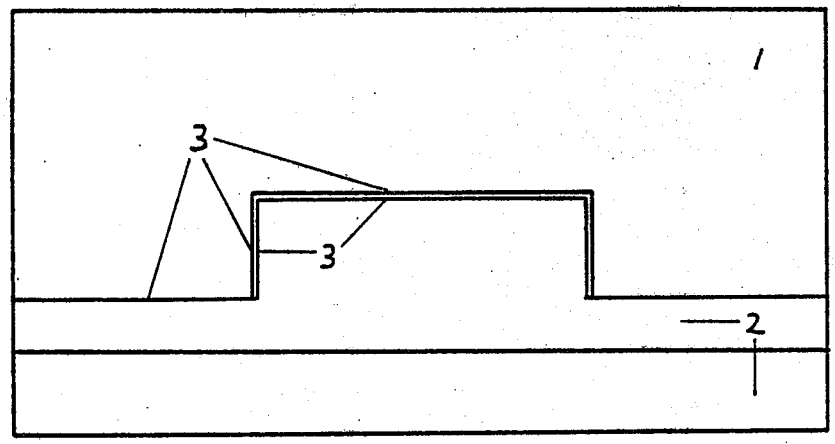
FIG. 6 illustrates a cross sectional view of the mold of FIG. 1 in a combined position as seen through section line C—C.

The operation of the mold is cyclical, each cycle comprises the following action. A conventional drive means not shown, combines the two mold parts 1 and 2 by relative movement of the mold parts 1 and 2 in horizontal direction. Plastic is injected into the cavity 5 in a conventional manner through a gate, not shown. The plastic solidifies while the two mold parts 1 and 2 still are in their combined position as shown in FIGS. 2, 4 and 6.

Figure 3:
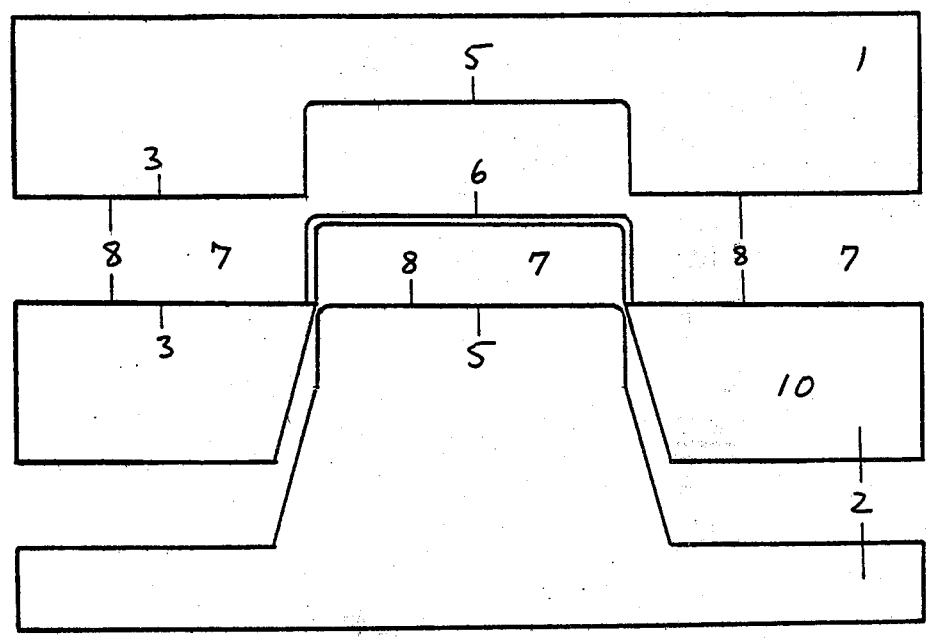
FIG. 3 shows the same cross sectional view as FIG. 2 but with the mold in a separated position.
Figure 5:
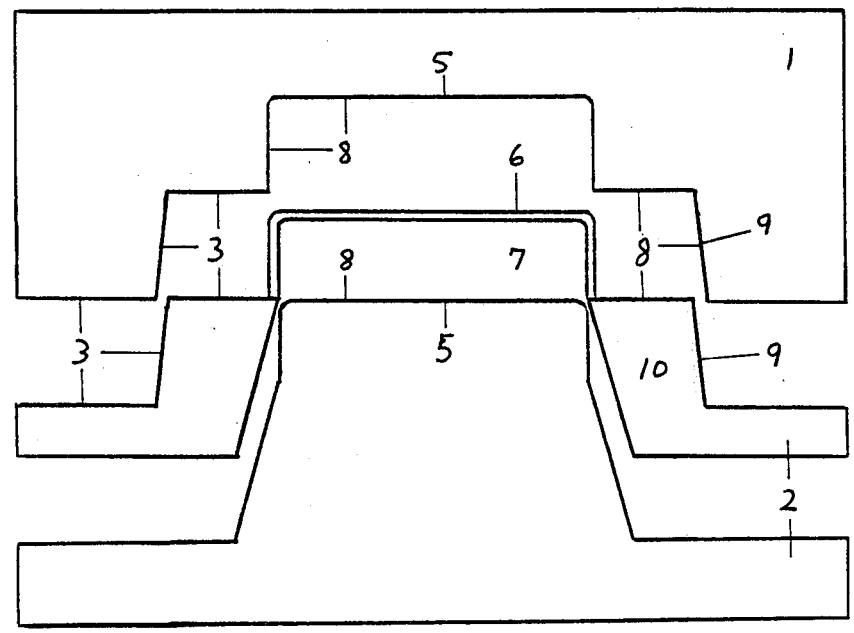
FIG. 5 shows the same cross sectional view as FIG. 4 but with the mold in a separated position.
Figure 7:
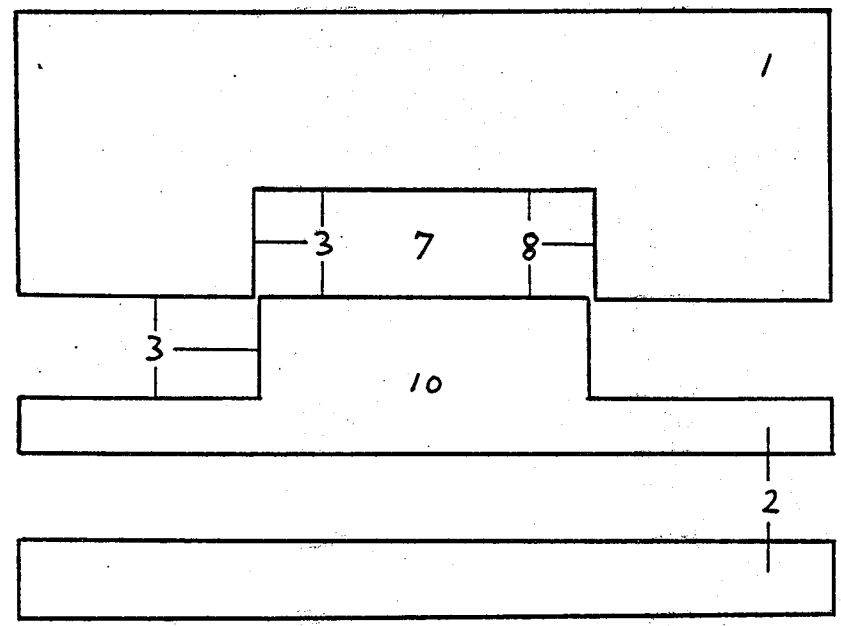
FIG. 7 shows the same cross sectional view as FIG. 6 but with the mold in a separated position.

When the plastic is solidified the drive means separates the two mold parts by relative movement of the mold parts 1 and 2 in a horizontal direction as best seen in FIGS. 3, 5 and 7. Viewing FIGS. 1, 3, 5 and 7 together, it is seen that separation of the two mold parts 1 and 2 creates the guide conduit 7, which leads in a direction parallel to line A—A (in FIG. 1), and which is substantially enclosed in the cross-sectional regions taken along lines B—B and C—C (in FIG. 1). The solidified molded plastic product 6 is ejected into the guide conduit 7, which leads in a vertical direction, by relative movement of the stripper plate 10 in relation to the rest of the mold part 2.

The ejected plastic product 6 is then transported by gravity down through the guide conduit 7, the contours 8a, 8b, 8c, 8g, 8k, 8l, 8m of which are exposed when the mold parts 1 and 2 are separated. The orientation of the product 6 is directed by the contours of the guide conduit.

FIGS. 8 to 11 illustrate various sectional views of the injection mold used in a second preferred embodiment of the method of the invention. Like reference numbers refer to like components in these figures.

The injection mold comprises a first mold part 1 and a second mold part 2 separated by a parting surface 3a, 3b, 3c', 3d', 3e', 3f, 3g', 3h' a cavity 5 which is situated internally to the boundaries 4 of the parting surface 3a, 3b, 3c', 3d', 3e',3f, 3g', 3h'. A molded plastic product 6, a petri dish, is shown being ejected by the stripper plate 10' from the cavity 5 into a guide conduit 7'. The contours 8a, 8b, 8c', 8g', 8k, 8l, 8m of the guide conduit 7' are substantially regions of the parting surface 3a, 3b, 3c', 3d', 3e', 3f, 3g', 3h' and the cavity 5. Steering cones 9a', 9b' have has the shape of conical surfaces and are used to guide the two mold parts accurately together when combined.

Figure 8:
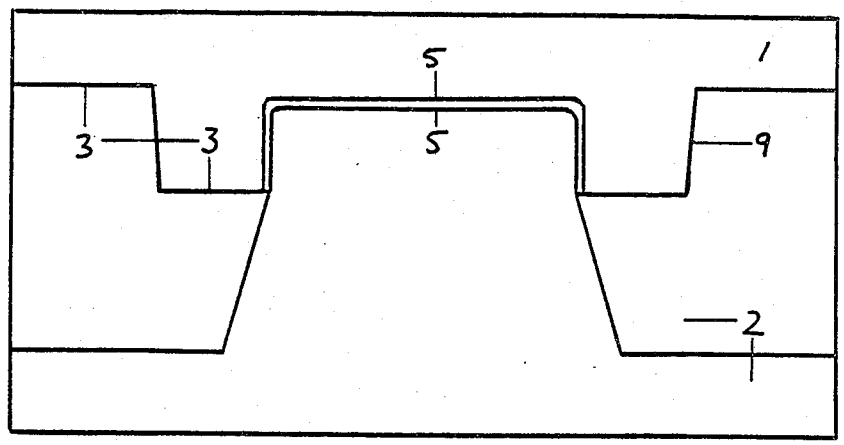
FIG. 8 illustrates a cross sectional view of an alternative preferred embodiment to that shown in FIGS. 1 to 7 with the mold in a combined position as seen from the same direction as FIG. 4.
Figure 10:
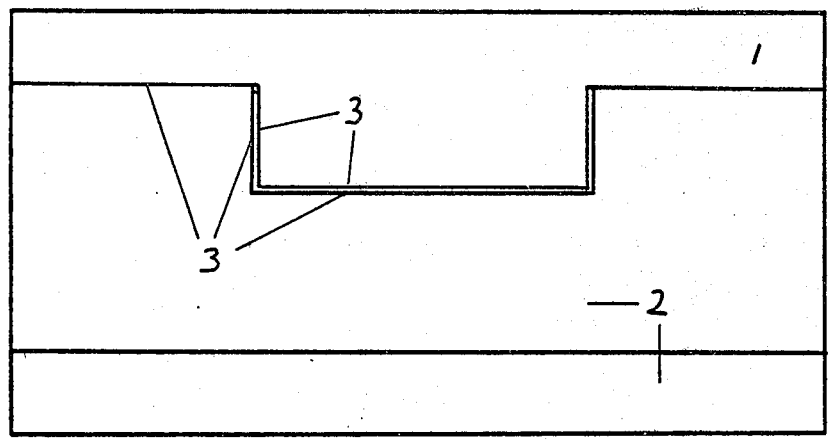
FIG. 10 illustrates the same preferred embodiment as shown in FIGS. 8 and 9. Shown is a cross sectional view of the mold in a combined position, seen from the same direction as FIG. 6.

The operation of the mold is cyclical, each cycle comprises the following action. A conventional drive means not shown combines the two mold parts 1 and 2 by relative movement of the mold parts 1 and 2 in horizontal direction. Plastic is injected into the cavity 5 in a conventional manner through a gate, not shown. The plastic solidifies while the two mold parts 1 and 2 still are in their combined position as shown in FIGS. 8 and 10.

Figure 9:
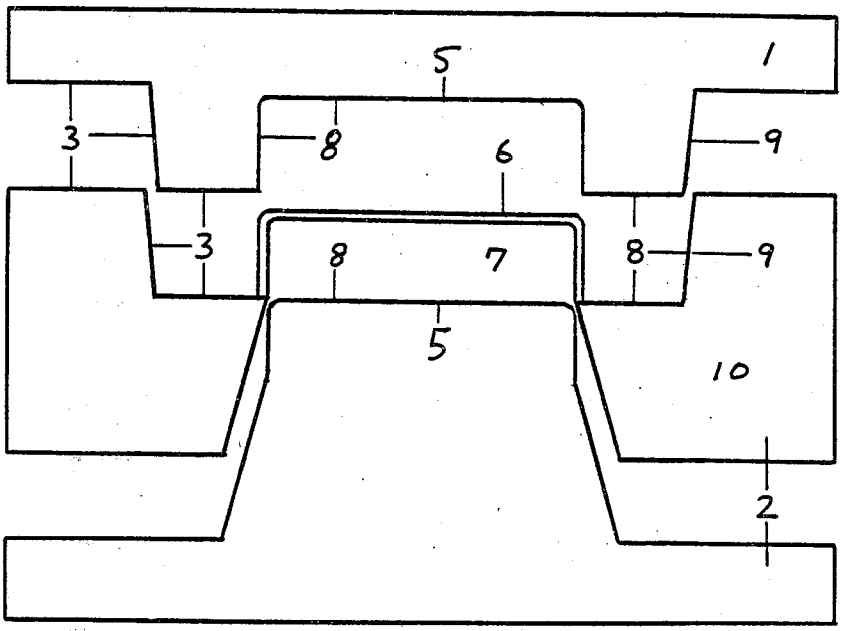
FIG. 9 shows the same cross sectional view as FIG. 8 but with the mold in a separated position.
Figure 11:
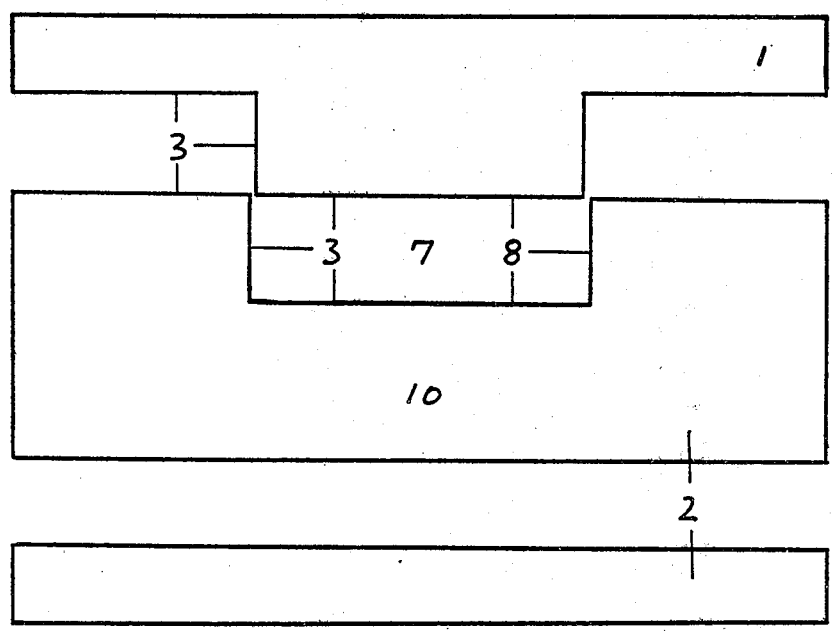
FIG. 11 shows the same cross sectional view as FIG. 10 but with the mold in a separated position.

When the plastic is solidified the drive means separates the two mold parts by relative movement of the mold parts 1 and 2 in a horizontal direction as best seen in FIGS. 9 and 11. Viewing FIGS. 1, 3, 9 and 11 together it is seen that separation of the two mold parts 1 and 2 creates the guide conduit 7', which leads in a direction parallel to line A—A (in FIG. 1), and which is substantially enclosed in cross-sectional regions taken along lines B—B and C—C (in FIG. 1). The solidified molded plastic product 6 is ejected into the guide conduit 7' which leads in a vertical direction, by relative movement of the stripper plate 10' in relation to the rest of the mold part 2.

The ejected plastic product 6 is then transported by gravity down through the guide conduit 7' the contours 8a, 8b, 8d', 8h', 8k, 8l, 8m of which are exposed when the mold parts 1 and 2 are separated. The orientation of the product 6 is directed by the contours of the guide conduit.

Figure 12:
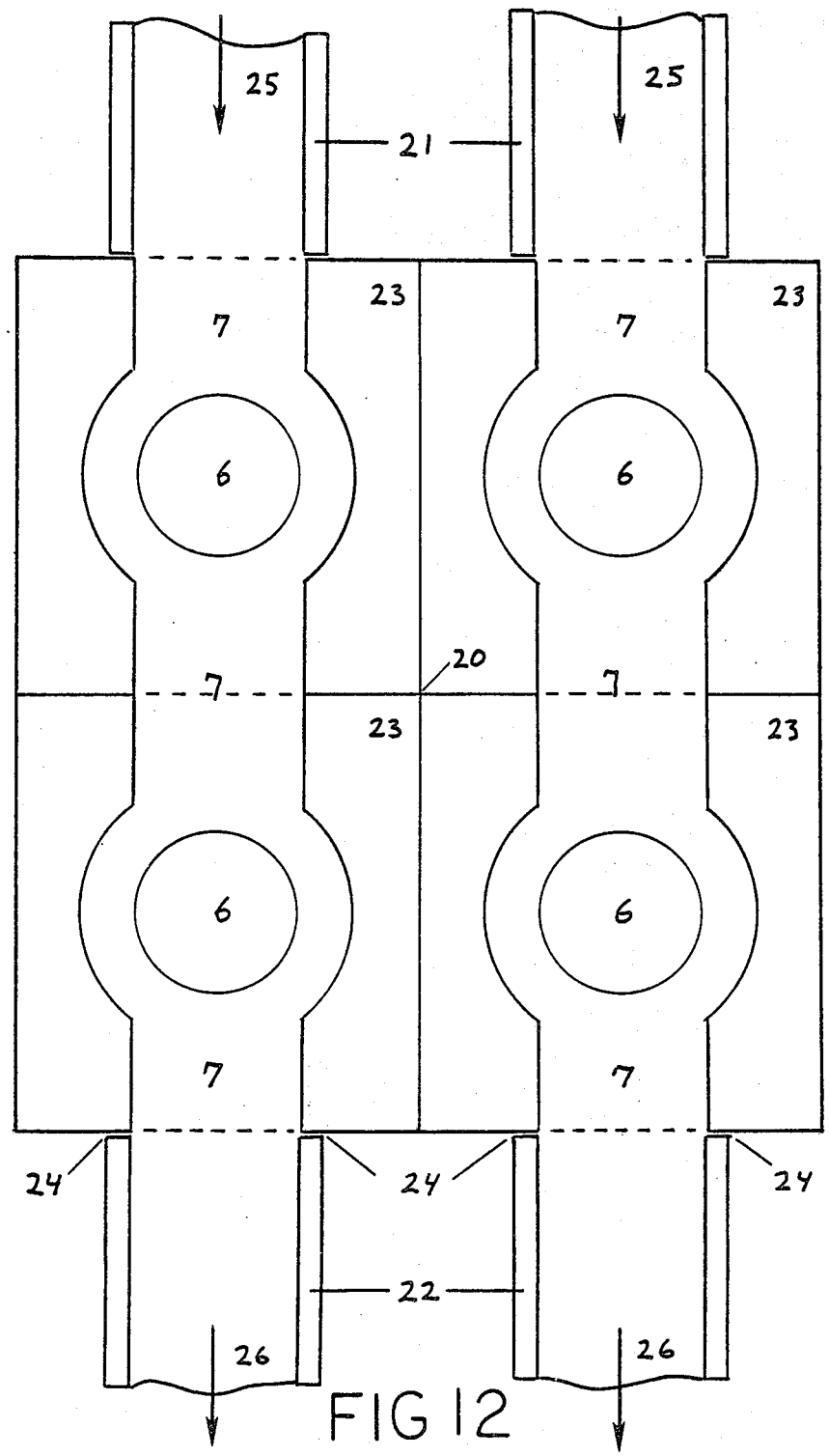
FIG. 12 is one-half of the scale of FIGS. 1 to 11 and illustrates an elevational transparent end view of an assembly mold made up of four molds of the type illustrated in any of the previous Figures.
Figure 1:
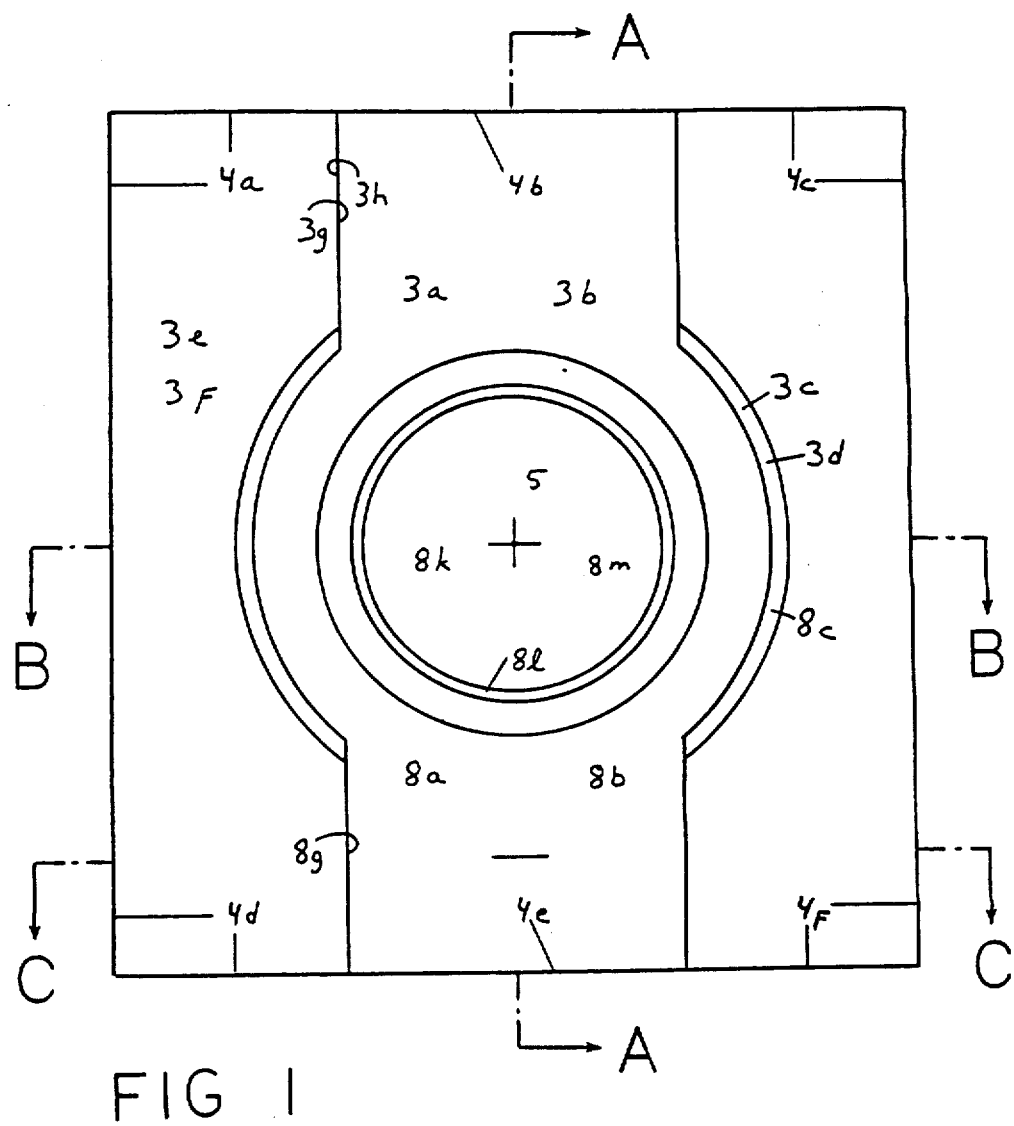
Figure 2:
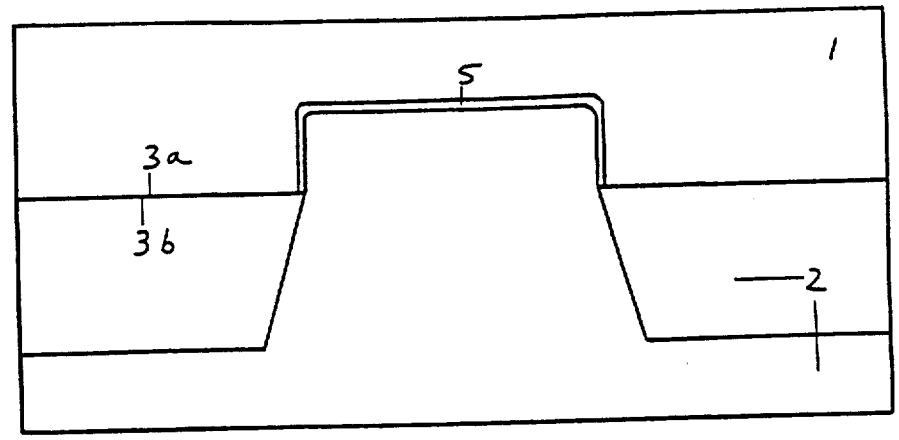
Figure 3:
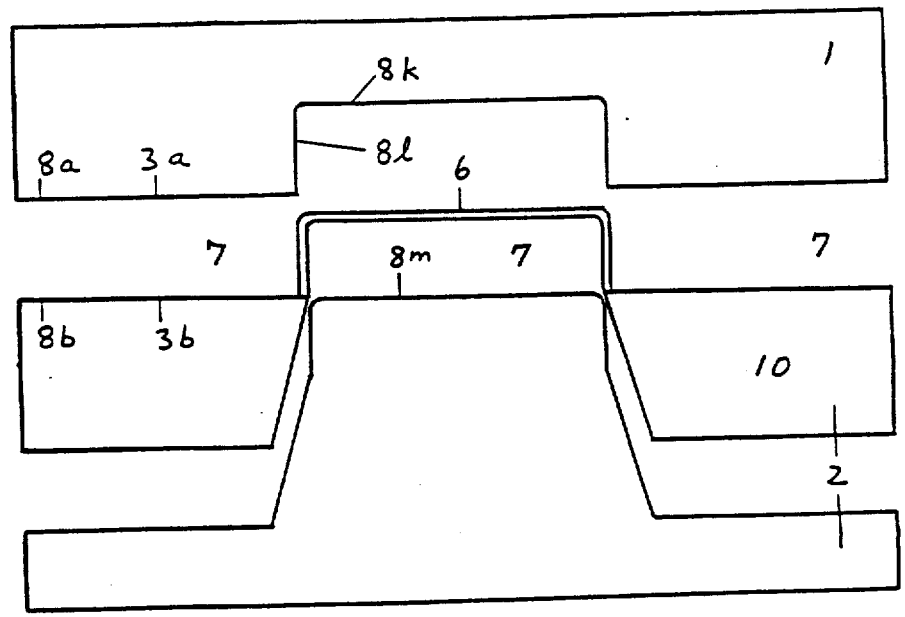
Figure 4:
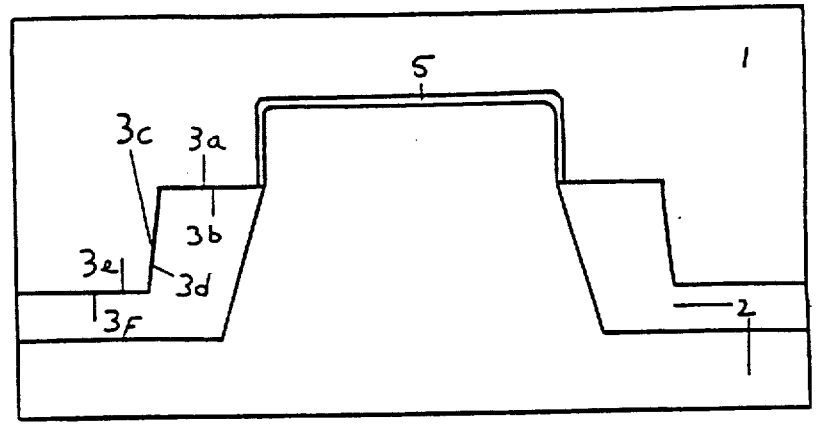
Figure 5:
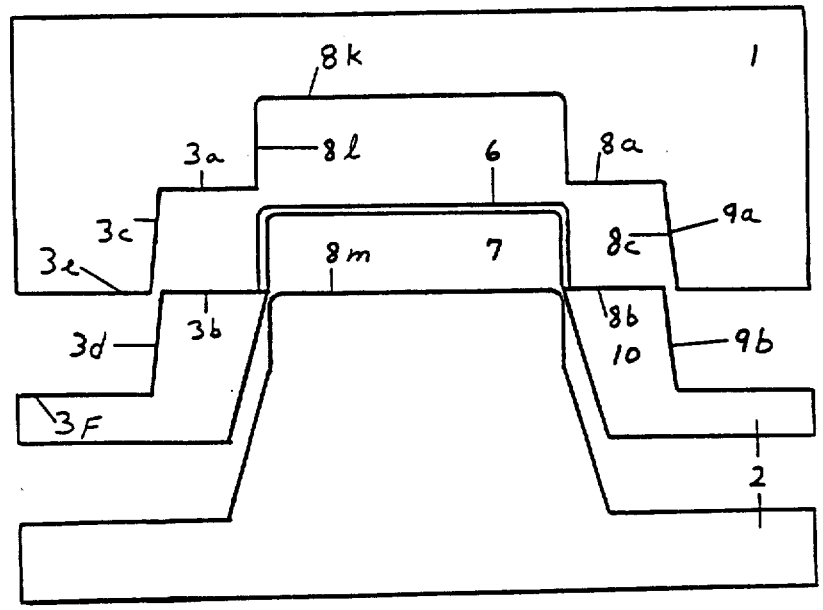
Figure 6:
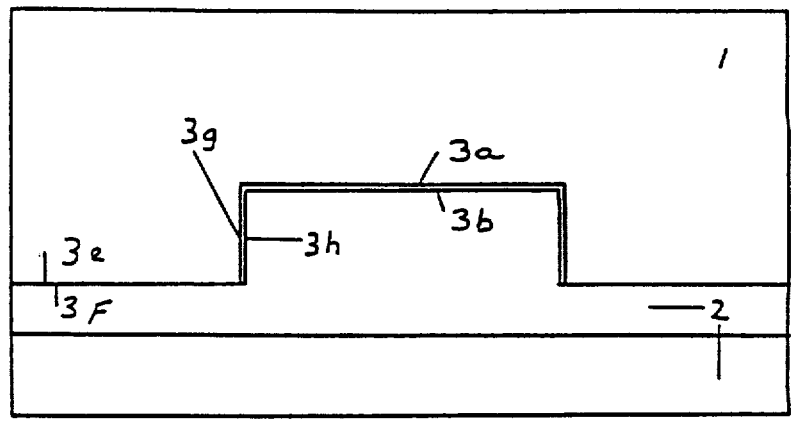
Figure 7:
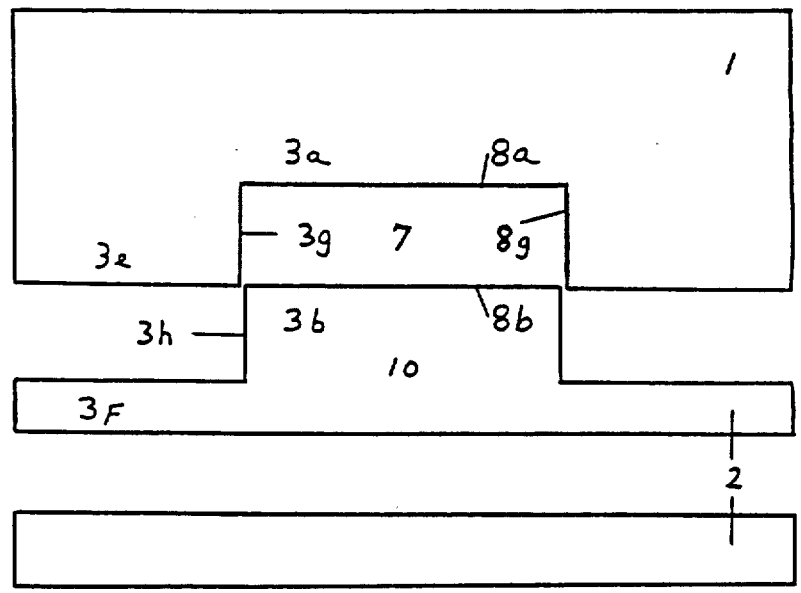
Figure 8:
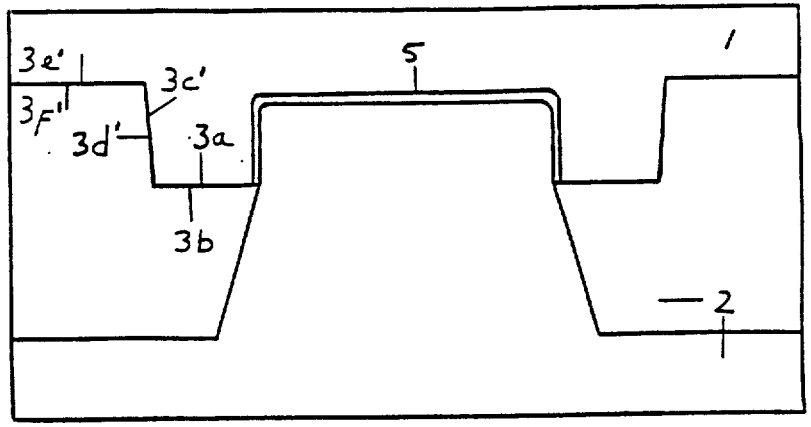
Figure 9:
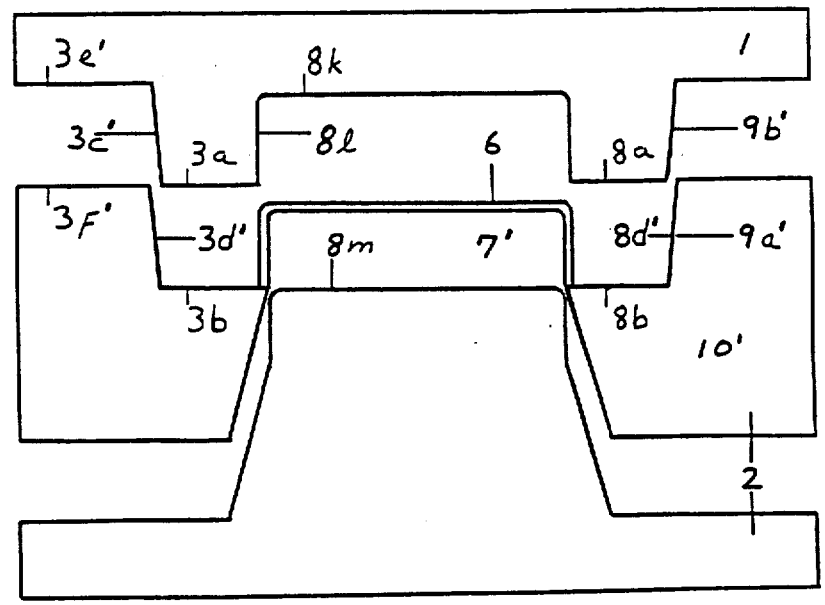
Figure 10:
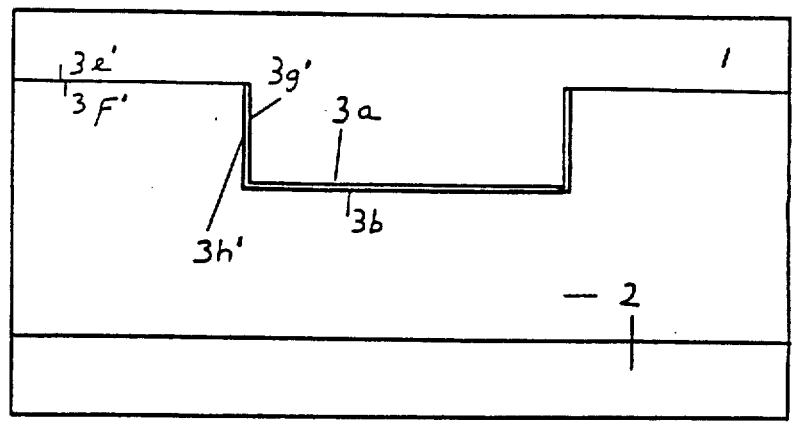
Figure 11:
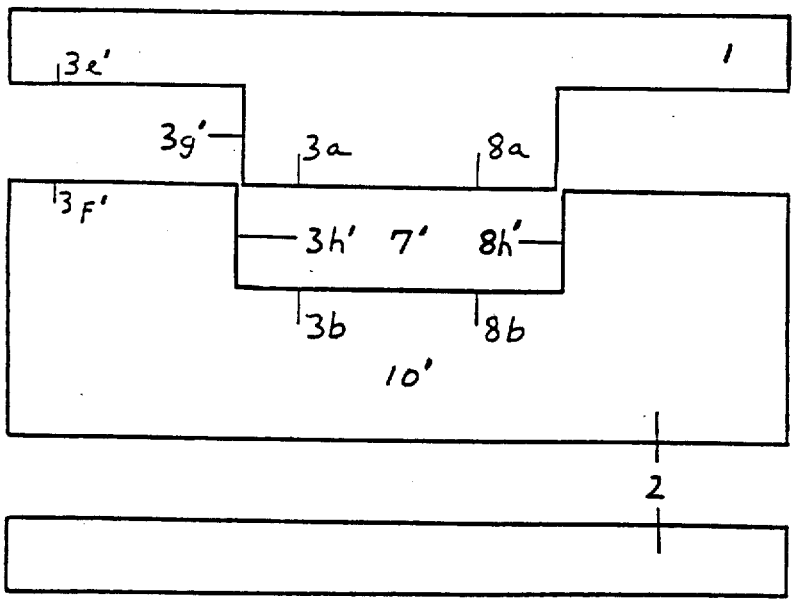
Figure 12:
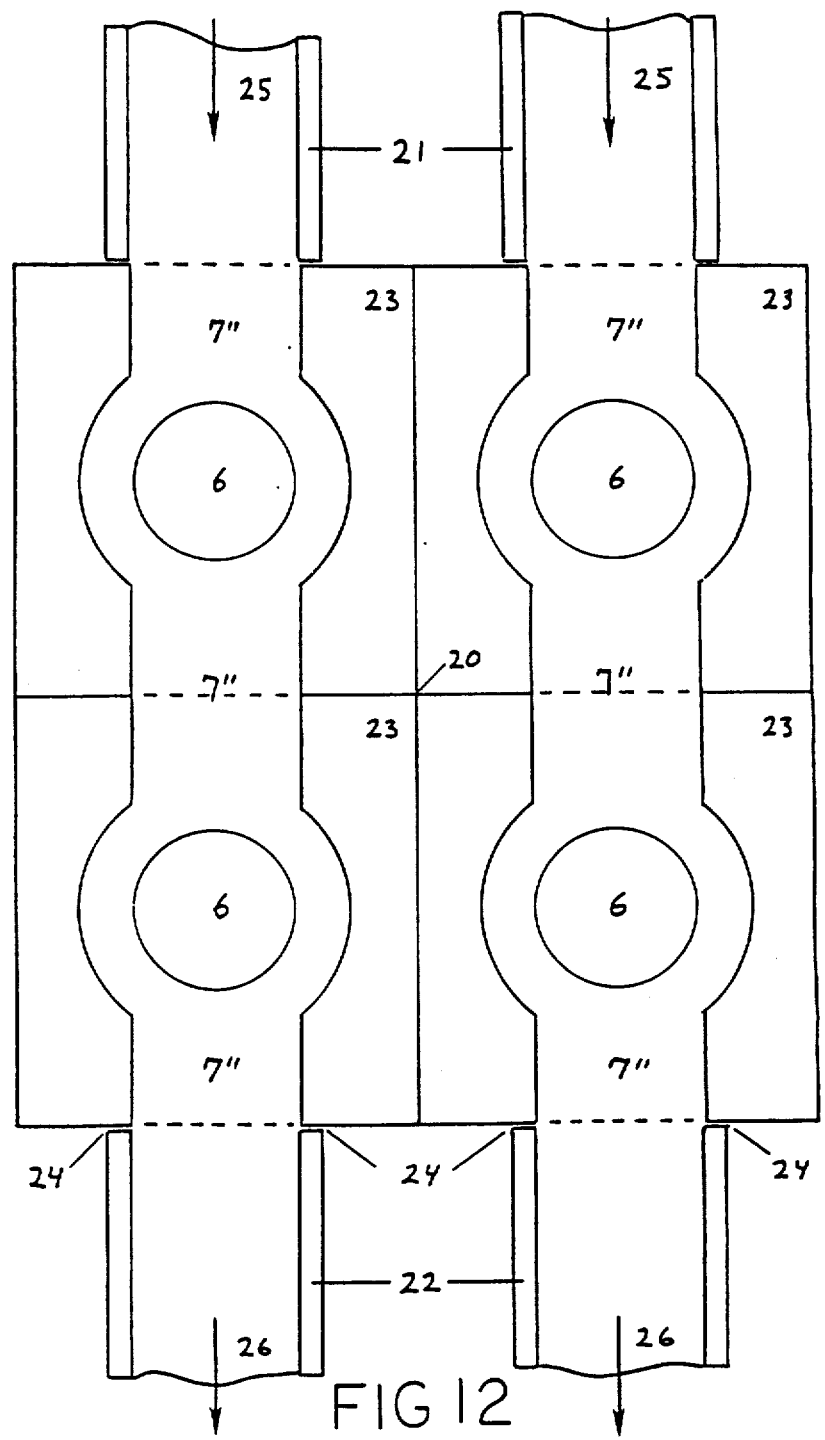

FIG. 12 illustrates a sectional view of an assembly mold 20 used in a third preferred embodiment of the method of the invention. The assembly mold 20 consists of four mold elements 23, similar to the single cavity molds described in FIGS. 1 to 11. Also shown in a position above the mold 20 are two supply conduits 21 for a stream of sterile air, and two product receiver guide conduits 22 in a position below the mold 20.

The two supply conduits 21, for the sterile air, connect to the upper ends of the two guide conduits 7" of the two upper mold elements 23. The lower ends of the two guide conduits 7" of the two upper mold elements 23 connect to the upper ends of the two guide conduits 7" of the two lower mold elements 7". The lower ends of the two guide conduits 7" of the two lower mold elements 23 connect to the two product receiver guide conduits 22.

The operation of the assembly mold is similar to the operation of the molds described in FIGS. 1 to 11. When the assembly mold 20 is in its separated position, a stream of sterile air is supplied by the supply conduits, in the direction of the arrows 25, the stream of air enhances the speed of transporting the molded products 6, petri dishes, down through the guide conduits 7". The molded products 6 from the upper two mold elements 23 pass through the guide conduits of the lower two mold elements 23 on their way to the product receiver guide conduits 22 which they pass through in the direction of the arrows 26. There is a stream of sterile air also in the product receiver guide conduits 22 but not necessarily in the direction of the arrows 24. If the stream of sterile air from the guide conduits 22 is in a direction opposite to the arrows 26, then both streams of air, that is from above through the mold guide conduits 7" and below through the product receiver guide conduit 22, will escape through a small opening 24 positioned where the mold guide conduits 7" are connected to the product receiver guide conduits 22.

If the stream of sterile air is moving in the direction of the arrows 26 that is moving in the same direction that the molded product 6 pass through the product receiver guide conduit 22, then the speed of transporting the molded product in the conduit 22 is enhanced. The temperature of the fluid injected plastic is at a sterilizing temperature, the molded product 6 is therefore sterile as ejected into the guide conduit 7" which conducts a stream of sterile air. The product receiver guide conduit 22 which also conducts a stream of sterile air, leads to a sterile packing environment where the molded product 6 is packed in a sterile condition in a sterile container.

From the time that the products 6 are ejected into the guide conduits 7" to the time they reach the packing environment, their orientation is directed by the contours of the guide conduits 7" and the product receiver guide conduits 22, in order to supply the products 6 for easy packing operation.

In FIG. 12 the cavities are positioned in two vertical rows of two. But it is, of course, possible to place any amount of vertical rows with any amount of cavities in each row. Also in FIG. 12, the direction of the arrows 25 and 26 point in a downward direction. But it is within the scope of the invention, to place the mold with an orientation in a suitable injection molding machine, so that the mold separates into its two constituent parts 1 and 2 by relative movement in a vertical direction, in which case the direction of the arrows 25 and 26 would be horizontal. In such case the transport of the molded parts 6 would not be by gravity, but may be accomplished by the stream of air alone. While the above description contains many specificities, these should not be construed as limitations on the scope of the invention, but rather as an exemplification of one preferred embodiment thereof. Many other variations are possible, for example molds may be utilized which have several parting surfaces, such as sandwich or stack molds. Molds may also be employed which do not have a stripper plate, but where ejection is accomplished by some other means such as pins or sleeves. In the drawings of the preferred embodiments, molds are shown which use a steering cone for guiding the two mold parts accurately together when combined, but other means of guiding may be used such as traditional leader pins. Accordingly, the scope of the invention should be determined not by the embodiments illustrated, but by the appended claims and their legal equivalents.

I claim:

1. A method of cyclic injection molding of plastic where the mold comprises two parts which are separated by a parting surface and at least one cavity situated internally to the boundaries of the parting surface, and wherein each production cycle comprises the steps of:
   (a) Combining the two mold parts by moving, in a predetermined direction, the mold parts in relation to each other;
   (b) Injecting plastic in a fluid state into a cavity situated within the parting surface;
   (c) Solidifying the injected plastic in the cavity, thereby creating a plastic product;
   (d) Separating the two mold parts by moving, in a direction opposite to the predetermined direction, said mold parts in relation to each other to create a substantially enclosed guide conduit having contours defined by the regions of the parting surface and the internally positional cavity/ies that are exposed subsequent to separation and leading in a direction substantially perpendicular to said predetermined direction;
   (e) Ejecting the plastic product into said guide conduit; and
   (f) Guiding and transporting the ejected product from between the mold parts through the guide conduit.

2. A method according to claim 1, wherein step (f) comprises the step of:
   (g) Transporting the ejected product through the guide conduit at an orientation directed by the contours of the guide conduit.

3. A method according to claim 1, wherein said (a) comprises the step of:
   (g) Combining the two mold parts in a horizontal direction.

4. A method according to claim 1 wherein step (e) comprises the step of:
   (g) Ejecting the plastic product into a guide conduit which leads in a substantially vertical direction.

5. A method according to claim 1, 2, 3 or 4 wherein step (f) comprises the step of:
   (h) Transporting the ejected product through the guide conduit with a stream of air.

6. A method according to claim 5 wherein step (h) comprises the step of:
   (i) Transporting the ejected product through the guide conduit with a stream of sterile air.

* * * * *

UNITED STATES PATENT AND TRADEMARK OFFICE
CERTIFICATE OF CORRECTION

Page 1 of 8

PATENT NO. : 4,422,998
DATED : December 27, 1983
INVENTOR(S) : Jens Ole Sorensen It is certified that error appears in the above-indentified patent and that said Letters Patent is hereby corrected as shown below:

In the drawing, cancel Figures 1 through 12, and insert the following Figures 1 through 12 as per attached sheets.

Signed and Sealed this

Seventh Day of June, 1994

Attest:

BRUCE LEHMAN

Attesting Officer          Commissioner of Patents and Trademarks